United States Patent
Ladra et al.

(10) Patent No.: US 7,208,901 B2
(45) Date of Patent: Apr. 24, 2007

(54) CONTROL METHOD FOR JERK-LIMITED SPEED CONTROL OF A MOVABLE MACHINE ELEMENT OF A NUMERICALLY CONTROLLED INDUSTRIAL PROCESSING MACHINE

(75) Inventors: Uwe Ladra, Erlangen (DE); Elmar Schäfers, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 427 days.

(21) Appl. No.: 10/816,788

(22) Filed: Apr. 2, 2004

(65) Prior Publication Data

US 2004/0239276 A1    Dec. 2, 2004

(30) Foreign Application Priority Data

Apr. 4, 2003    (DE) .................... 103 15 525

(51) Int. Cl.
G05B 19/416    (2006.01)
G05B 7/02    (2006.01)

(52) U.S. Cl. .................. 318/600; 318/621; 318/629; 318/632

(58) Field of Classification Search ........... 318/566, 318/568.15, 568.22, 573, 600, 611, 621, 629, 318/632
See application file for complete search history.

(56) References Cited

U.S. PATENT DOCUMENTS

| 5,057,756 | A | * | 10/1991 | Hara ................... 318/569 |
| 5,331,264 | A | * | 7/1994 | Cheng et al. ........... 318/568.11 |
| 6,320,345 | B1 | | 11/2001 | Kazuaki et al. |
| 6,507,165 | B2 | * | 1/2003 | Kato et al. ............. 318/611 |
| 6,825,633 | B2 | * | 11/2004 | Hamann et al. ........ 318/600 |

FOREIGN PATENT DOCUMENTS

| DE | 100 16 137 A | 10/2001 |
| DE | 101 18 477 A1 | 12/2001 |
| DE | 100 63 722 A | 7/2002 |
| DE | 100 63 722 A1 | 7/2002 |
| DE | 102 00 680 A1 | 8/2003 |
| EP | 0 685 779 A1 | 12/1995 |

* cited by examiner

Primary Examiner—Bentsu Ro
(74) Attorney, Agent, or Firm—Henry M. Feiereisen (57) ABSTRACT

A control method for controlling a speed of a movable machine element of a numerically controlled industrial processing machine with jerk limitation is described. The processing machine can be, for example, a machine tool, a production machine and/or a robot. A travel path of the movable machine element is first decomposed into a plurality of sequentially arranged, interpolatable travel sections. Jerk profiles are then determined for the interpolatable travel sections, which are modified with a parameter-dependent shape function. The modified jerk profiles provide a filter action that can be represented by bandpass filters having blocking frequencies. The blocking frequencies of the bandpass filters are selected so as to substantially correspond to characteristic frequencies of the machine element. The control method significantly improves the machine dynamics without sacrificing accuracy.

18 Claims, 4 Drawing Sheets

CONTROL METHOD FOR JERK-LIMITED SPEED CONTROL OF A MOVABLE MACHINE ELEMENT OF A NUMERICALLY CONTROLLED INDUSTRIAL PROCESSING MACHINE

CROSS-REFERENCES TO RELATED APPLICATIONS

This application claims the priority of German Patent Application, Serial No. 103 15 525.2, filed Apr. 4, 2003, pursuant to 35 U.S.C. 119(a)–(d), the disclosure of which is incorporated herein by reference.

BACKGROUND OF THE INVENTION

The present invention relates to a control method for jerk-limited speed control of a movable machine element of a numerically controlled industrial processing machine, such as a machine tool, production machine or a robot. In the context of this application, the term "production machine" is used in a generic sense and also includes robots which generally follow the concepts outlined here.

A mechanical system that is capable of performing oscillations (e.g., along the axes of the machine tool) is typically characterized by at least one characteristic frequency which is excited by a movement or displacement and which can be observed in the actual position value. Excitations of the various mechanisms of a machine should therefore be eliminated.

Conventional numerical controllers that control the speed of, e.g., a machine tool, production machine or a robot, typically include a jerk limitation. The goal is to reduce the load on the various axes of the machine without adversely affecting the program processing time.

A jerk limitation can slow down the buildup of the acceleration of a machine movement so as to smooth the desired value and to move the machine mechanism with the smallest possible oscillation excitation.

However, the smoothing effect of a jerk limitation depends strongly on the desired curve for the setpoint value. Measurements and theoretical studies have shown that higher-frequency acceleration and braking processes have to be performed with a lower dynamic range so as keep the excitations of the oscillatable mechanism small. This dependence applies to both short-term positioning actions as well as, for example, for controlling the entire path of the machine.

Currently, this problem is addressed by adjusting the jerk limit value and the acceleration limit value to a low value, so that even high-frequency changes in the path speed do not significantly excite the oscillations. However, setting the dynamic values very low often prevents a higher path speed and hence also a shorter program processing time, which would be otherwise desirable.

A known method for producing a speed profile that protects the machine includes a jerk limitation. In phase 1, the machine or machine element is moved with the highest acceptable acceleration. In phase 2, the acceleration remains constant so that the speed increases linearly. In phase 3, the acceleration is then decreased. In the following, the term acceleration is meant to also include a possible negative acceleration.

Accordingly, a maximum allowable path speed is reached at the end of the phase 3, which is then used for moving the machine or machine elements during phase 4. The velocities now decrease in an analog fashion during additional phases 5 to 7, so that the path speed becomes zero when a desired position is reached. For this purpose, a negative acceleration is generated in phase 5, which is kept constant in phase 6 and again reduced to zero in phase 7. The slope of the acceleration in phases 1, 3, 5, and 7 is critical for the jerk limitation of the machine. The speed curve in these phases can be described by a polynomial, whereas in the other phases the speed is linear or constant.

Figure 1:
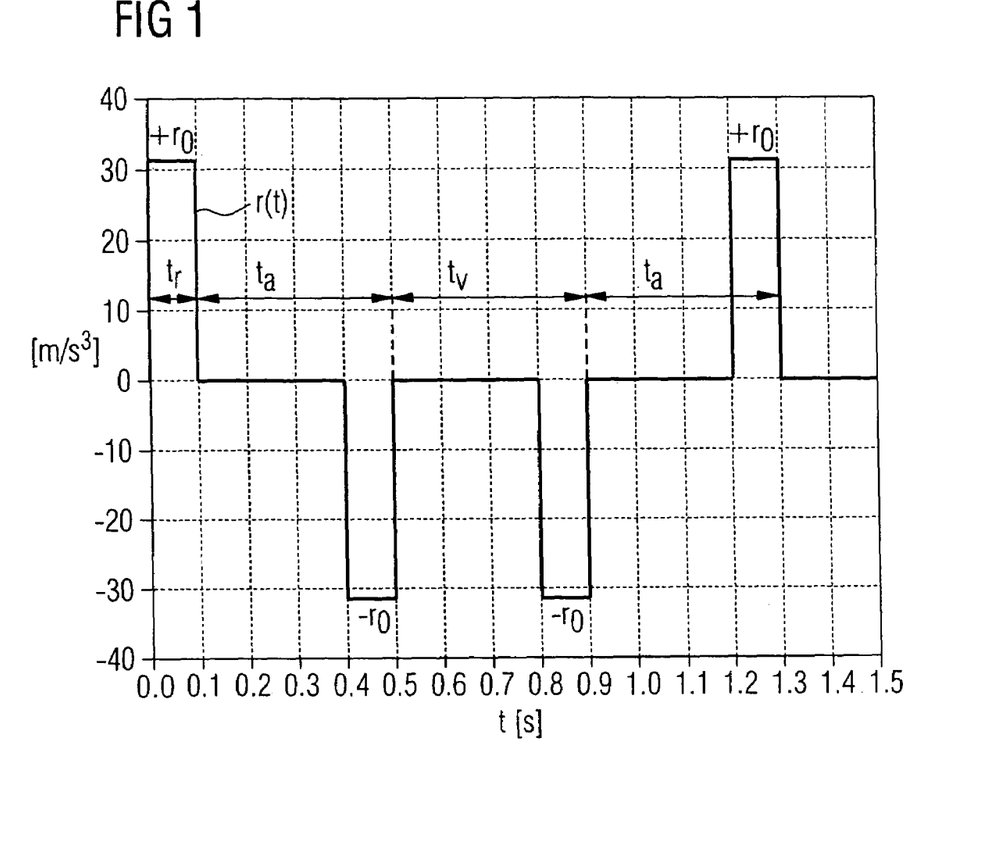
FIG. 1 is a graphical illustration of a rectangular jerk profile of a conventional jerk limitation.

As discussed above, the time dependence of the jerk r(t) is composed of constant rectangular basic shapes. FIG. 1 shows the time dependence of the jerk r(t) during the time intervals $t_r$, $t_a$, and $t_v$, which represent the time intervals of the jerk r(t) for an exemplary motion path of a movable machine element. The jerk r(t) is either equal to zero or is equal to its permissible maximum value $r_0$ with a positive or negative sign: r(t) with $r(t) \epsilon \{0, +r_0, -r_0\}$.

The time-dependent curve of the jerk r(t) for a movement or a displacement of the movable machine element will in the following be referred to as a jerk profile r(t).

A control method for jerk-limited speed control of a movable machine element is known from the German patent application DE 102 00 680.6. This application suggests that the transient behavior of the movable machine elements can be improved by changing or adapting the jerk profile with the help of a $\sin^2$ shape function.

The aforementioned problem is that acceleration and braking processes with a high dynamic range along the travel path x of the machine element can still cause mechanical oscillations in a certain frequency range. The dynamic properties of these processes should therefore be adapted to the characteristic properties of the machine.

It would therefore be desirable and advantageous to provide a control method for controlling a speed of a movable machine element of a numerically controlled industrial processing machine, which obviates prior art shortcomings and specifically eliminates the excitation of characteristic resonance frequencies of a machine or a movable machine element.

SUMMARY OF THE INVENTION

The control method according to the present invention describes a new approach whereby, unlike with the conventional method, not a specific shape function is selected, but an optimal shape function is computed based on the dominant characteristic frequencies of the machine. In this way, the dynamic properties of the machine can be significantly improved over the conventionally attained dynamic properties of the machine without sacrificing accuracy.

According to one aspect of the invention, a control method for controlling a speed of a movable machine element of a numerically controlled industrial processing machine with jerk limitation is disclosed. The control method includes the steps of decomposing a travel path of the movable machine element into a plurality of sequentially arranged, interpolatable travel sections, determining jerk profiles for the interpolatable travel sections, and modifying the jerk profiles with a parameter-dependent shape function. The modified jerk profiles in a corresponding travel section provide a filter action represented by bandpass filters having blocking frequencies. The blocking frequencies of the bandpass filters correspond substantially to the characteristic frequencies of the machine element.

The excitation of resonances can be prevented by intentionally adapting the jerk curve with a parameter-dependent shape function. Not only can the dynamic limit values be significantly increased in this way, but the program processing time can also be reduced considerably.

A control method according to the invention has, i.a., the following advantages:

A significantly reduction of oscillation excitations as compared to the state-of-the-art when moving the same distance during the same time interval.

A faster movement of the machine element for the same oscillation excitation as compared to the state-of-the-art.

This produces much softer movements in machine tools, production machines and robots, a higher accuracy, e.g., for surface machining, and an improved quality. It also increases the machining speed, a higher parts throughput and a higher efficiency without sacrificing quality.

According to another advantageous feature of the invention, the parameter-dependent shape function can be defined by at least one parameter $\alpha_i$. In this way, the frequencies of the bandpass filters can be easily adapted to the characteristic frequencies of the machine element and/or the machine or a selected subset of the machine element and/or the machine.

According to another feature of the invention, the parameter-dependent shape function can be defined by a single parameter $\alpha$. Since only a single parameter is provided for adapting the shape function, the frequency of a bandpass filter can be particularly easily adapted to the characteristic frequencies of the machine element and/or the machine.

The shape function and the resulting jerk profile can have a particularly advantageous shape when the frequency of the bandpass filter is adapted to the characteristic frequency of the machine element and/or the machine by adding a rectangular shape function and a $\cos^2$ or $\sin^2$ shape function and/or alternatively by adding a rectangular shape function and a Dirac shape function.

A loss of path length can be prevented by modifying the shape of the jerk profile with the parameter-dependent shape function so that the area of the jerk profile after the modification is identical to the area of the jerk profile before the modification, when computed over an identical time interval.

According to another advantageous feature of the invention, a rectangular jerk profile that is optimized for the corresponding interpolatable travel sections can be determined before having the movable machine element execute a defined travel path. The rectangular jerk profile is selected so that the blocking frequencies of the bandpass filters coincide essentially with the characteristic frequencies of the machine element. The optimized rectangular jerk profile is then further modified with the parameter-dependent shape function. This approach includes exhausts all possibilities for optimization and produces an optimized global result.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exemplary rectangular jerk profile r(t) as a function of time t. The term "jerk" herein refers to the time derivative of the acceleration a(t). The jerk profile r(t) is characterized by its maximum jerk height $r_0$ as well as by the various times $t_r$, $t_a$ and $t_v$ that describe the motion path of the movable machine element. In order to ensure a very stiff transient response of an actual position value $x_{ist}(t)$ of a movable machine element after the machine element has moved, conventional control methods employ a so-called jerk limitation, whereby the maximum jerk is limited to a value of, e.g., $r_0$. As described above, an improved jerk limitation can be achieved by modeling and adapting the jerk curve with a $\sin^2$ shape function.

Figure 2:
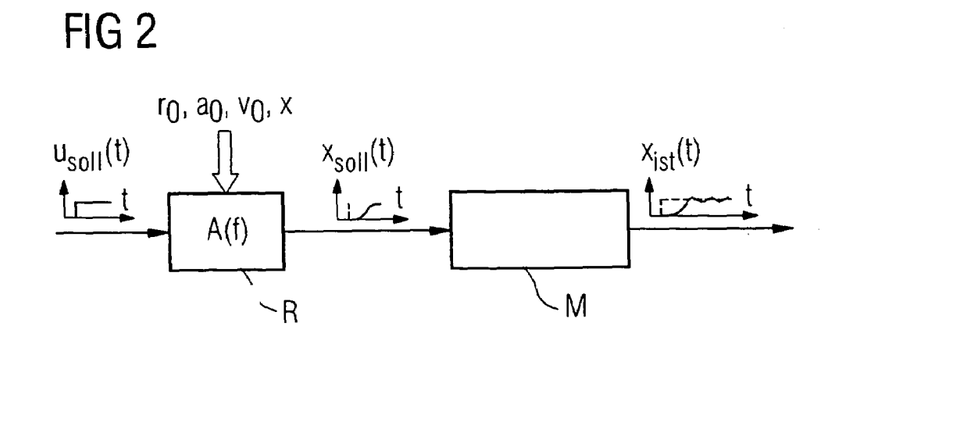
FIG. 2 is a block diagram of a system capable of performing oscillations, with a jerk-limited desired position value and an oscillating actual position value.

Turning now to FIG. 2, an oscillatable system M with a jerk-limited desired position value $x_{soll}(t)$ and an oscillating actual position value $x_{ist}(t)$ is shown to systematically describe the inadequacy of a jerk limitation. The frequency dependence of the amplitude B(f) of the transfer function A(f) of the jerk-equivalent filter R is computed. The frequency dependence of the amplitude B(f) of the transfer function A(f) of the jerk-equivalent filter R can be determined as a function of the limit values (e.g., the maximum speed $v_0$, the maximal acceleration $a_0$, the maximum jerk $R_0$) and the traveled path or the movement along the motion path x. The amplitude-frequency curve of the transfer function A(f) describes the excitation of the oscillatable system M over the entire frequency range.

The filter effect of the jerk limitation was systematically analyzed and optimized within the context of the invention. With the limit values $r_0$, $a_0$ and $v_0$ preset by the controller, a desired output position value $x_{soll}(t)$ is obtained for an arbitrarily set input position value $u_{soll}(t)$. The desired output position value $x_{soll}(t)$ is supplied, for example, to a controller that controls the movement or the displacement of a machine element.

The exemplary amplitude-frequency curve B(f) of the transfer function A(f) for a jerk-equivalent filter R is obtained by dividing the Fourier-transformed desired position value by the Fourier-transform of the desired input position value $u_{soll}(t)$ and then computing the absolute value. The filter effect of the jerk limitation can hereby be determined for any mechanical system. For computing the amplitude-frequency curve B(f) of the transfer function A(f), according to FIG. 3, of the jerk-equivalent filter R, the jerk profile r(t) shown in FIG. 1 was first successively integrated three times to determine the desired position value $x_{soll}(t)$.

Figure 5:
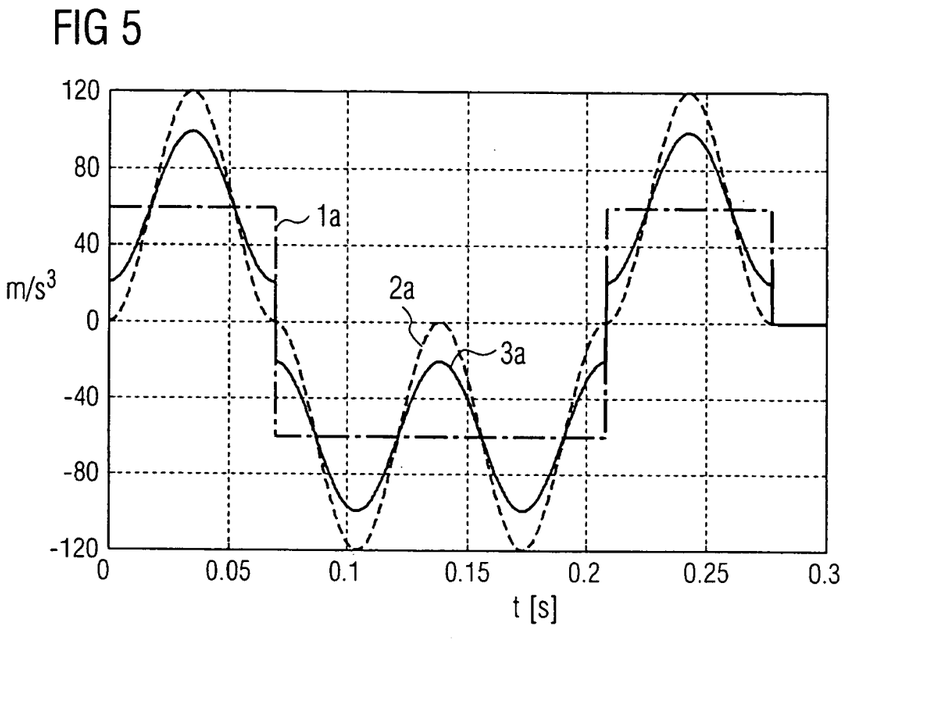
FIG. 5 is a graphical illustration of three different jerk profiles.

The systematic approach of the invention for minimizing of the excitation of oscillations can be best understood from an analysis of the jerk limitation with the help of the jerk-equivalent filter R. This approach, which will be described below, is much more sophisticated than the commonly used jerk limitation and even the jerk limitation employing a $\sin^2$ shape function. Importantly, the excitation of oscillations of the movable machine elements, such as the tools of the machine, can be decreased by a parameter-dependent change of the shape of the jerk profile r(t). A so-called shape function F(t) is introduced and used to generate an optimized jerk profile r(t) as depicted in FIG. 5.

The invention describes a control method which, unlike the afore-described methods, does not preselect a special shape function F(t), but instead computes an optimal shape function F(t) based on the dominant characteristic frequencies of the machine mechanism. In this way, the dynamical characteristic of the machine can be significantly enhanced while still maintaining the required machine precision.

It can be mathematically shown that the transfer function A(f) of a jerk-equivalent filter R can be expressed by the equation $$A(f) = S \cdot [\Im(F(t/t_r))] \cdot [si(\pi t_a f) \cdot si(\pi (t_a + t_v)f)] \cdot e^{-j\pi f(t_r + 2t_a + t_v)} \quad (1)$$

wherein f is the frequency, $\Im(F(t))$ is the Fourier transform of the shape function F(t), $$si(x) = \frac{\sin(x)}{x},$$

e is the Euler number, j is the imaginary unit, and wherein $t_r$, $t_a$ and $t_v$ correspond to the times depicted in FIG. 1.

The factor S is the so-called multiplication factor of the shape function $F(t/t_r)$ and serves to adapt the amplitude of the shape function to the height of the jerk profile (normalization of the shape function $F(t/t_r)$). The times $t_r$, $t_a$ and $t_v$ are defined by the boundary conditions (maximum value of the speed $v_0$, maximum acceleration $a_0$, and maximum jerk $r_0$) as well as by the displacement x. The object here is to change or adapt to the jerk profile r(t) and thereby modify the frequency-dependence of the amplitude B(f) of the transfer function A(f), so that the frequencies of the bandpass filters of the amplitude curve B(f) of the transfer function A(f) of the jerk-equivalent filter R coincide essentially with the characteristic frequencies of the machine elements and/or the machine or with a subset of such characteristic frequencies. In this way, the highest possible damping in the corresponding frequency ranges of the bandpass filter is obtained.

Figure 3:
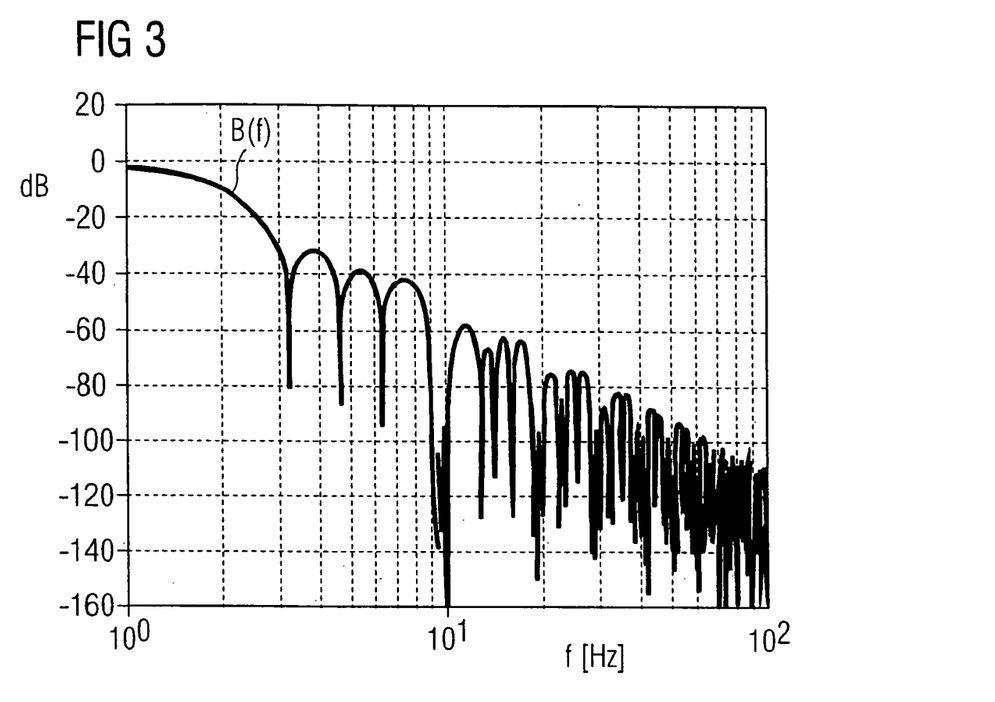
FIG. 3 is a graphical illustration of an amplitude-frequency curve of the transfer function A(f) of a jerk-equivalent filter.

The afore-described approach should not impair the dynamic characteristics, i.e., the travel time should remain unchanged while also not diminishing the accuracy. The frequency-dependence of the amplitude curve B(f) of the transfer function A(f) of the jerk-equivalent filter R can be adapted by the shape function $F(t/t_r)$, as is evident from equation (1). A shape function $F(t/t_r)$ which has a filtering effect to prevent excitation of these frequencies, can be computed by taking into account the relevant characteristic frequencies of the oscillatable mechanical system. The term "bandpass filters" herein refers to the frequency ranges of the amplitude-frequency curve B(f) of the transfer function A(f) of the jerk-equivalent filter R where the amplitude-frequency curve B(f) of the transfer function A(f) of the jerk-equivalent filter R of FIG. 3 has peaks with a high damping. This is indicated in FIG. 3 by the notches in the frequency curve.

The shape function F(t) can be adapted to the machine characteristics by defining a so-called parameter-dependent shape function F(t, α), which has a shape that is defined by a single parameter α. It will be understood by those skilled in the art that other shape functions can also be selected that depend, for example, on several parameters.

The use of a parameter-dependent shape function $F_s(t, \alpha)$, which is defined by adding a rectangular shape function $F_1(t, \alpha)$ and a $\cos^2$ shape function $F_2(t)$, will now be described. The parameter α determines the weight of the contributions from the two shape functions $F_1(t)$ and $F_2(t)$.

Figure 4:
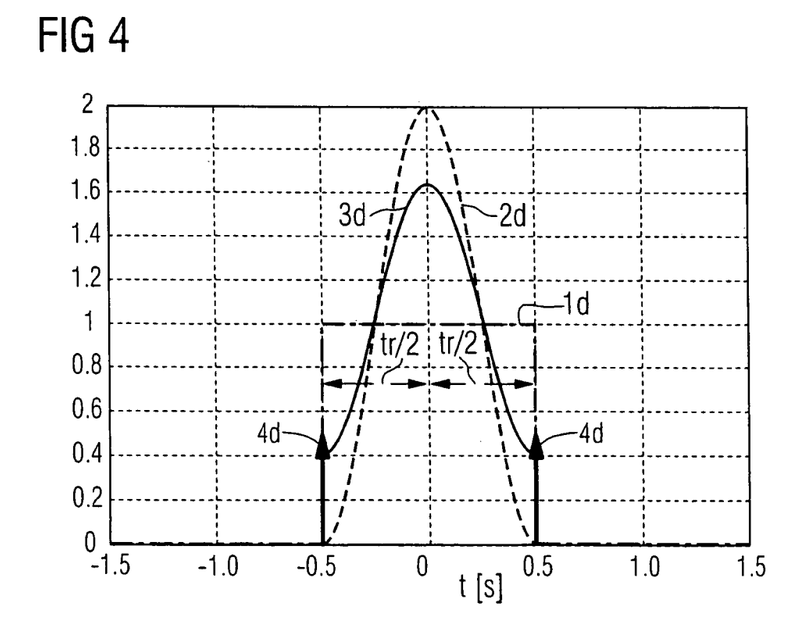
FIG. 4 is a graphical illustration of three exemplary shape functions.

The rectangular shape function $F_1(t)$ is defined by equation (2). The rectangular shape function $F_1(t)$ is shown in FIG. 4 as curve 1d.

$$F_1(t) = \prod_{-\frac{t_r}{2}}^{\frac{t_r}{2}} \left(\frac{t}{t_r}\right) \quad (2)$$

wherein $$\prod_a^b (x) = 1$$

in the interval between a and b, and $$\prod_a^b (x) = 0$$

elsewhere.

The Fourier transform of the shape function $F_1(t)$ is defined by equation (3):

$$\Im(F_1(t)) = \frac{\sin(\pi f t_r)}{\pi f t_r} \quad (3)$$

The time dependence of the $\cos^2$ shape function $F_2(t)$ is defined by equation (4) and is shown in FIG. 4 as curve 2d.

$$F_2(t) = 2 \cdot \prod_{-\frac{t_r}{2}}^{\frac{t_r}{2}} \left(\frac{t}{t_r}\right) \cdot \cos^2(\pi t / t_r) \quad (4)$$

The Fourier transform of the shape function $F_2(t)$ is defined by equation (5):

$$\mathfrak{J}(F_2(t)) = \frac{\sin(\pi f t_r)}{\pi f t_r} \cdot \frac{1}{1 - (f t_r)^2} \quad (5)$$

The two shape functions $F_1(t)$ and $F_2(t)$ are then added and weighted with a single parameter $\alpha$, whereby the shape function $F_1(t)$ is weighted by multiplication with the parameter $\alpha$, and the shape function $F_2(t)$ is weighted by multiplication with the parameter $(1-\alpha)$. The result is a parameter-dependent shape function $F_s(t, \alpha)$ according to equation (6):

$$F_s(t, \alpha) = \alpha \cdot \prod_{-\frac{t_r}{2}}^{\frac{t_r}{2}} \left(\frac{t}{t_r}\right) + 2(1 - \alpha) \cdot \prod_{-\frac{t_r}{2}}^{\frac{t_r}{2}} \left(\frac{t}{t_r}\right) \cdot \cos^2(\pi t / t_r) \quad (6)$$

The time dependence of the parameter-dependent shape function $F_s(t)$ is shown in FIG. 4 as curve 3d.

The Fourier transform of the parameter-dependent shape function $F_s(t, \alpha)$ is defined by equation (7):

$$\mathfrak{J}(F_s(t, \alpha)) = \frac{\sin(\pi f t_r)}{\pi f t_r} \cdot \frac{1 - \alpha(f t_r)^2}{1 - (f t_r)^2} \quad (7)$$

The parameter-dependent shape function $F_s(t, \alpha)$ is obtained by adding the two shape functions $F_1(t)$ and $F_2(t)$ after weighting with the parameter $\alpha$, as described above. An additional zero value in the frequency-space amplitude of the Fourier transform of the parameter-dependent shape function $F_s(t, \alpha)$, that depends on the parameter $\alpha$ and the jerk time $t_r$, is obtained at the frequency $$f_0 = \frac{1}{\sqrt{\alpha} \cdot t_r} \quad (8)$$

The jerk time $t_r$ is typically defined by the motion characteristic and the travel path and cannot be arbitrarily changed, As a result, the jerk time $t_r$ in the iterations (6) to (8) is generally predefined and can no longer be viewed as a parameter that can be freely selected by the user.

The amplitude of the Fourier transform of the shape function $F_s(t, \alpha)$ depends on the parameter $\alpha$ in such a way that the zero value $f_0$ can be moved across the entire frequency range by varying $\alpha$. The parameter $\alpha$ therefore represents an additional degree of freedom.

The bandpass filters shown in FIG. 3 can be modified by changing the parameter $\alpha$ in such a way that the frequencies of the bandpass filters coincide essentially with the characteristic frequencies of the machine element and/or of the machine or with a subset of such characteristic frequencies. The bandpass filters indicate those frequency ranges where the amplitude of the frequency curve B(f) of the transfer function A(f) is highly damped (notch). The parameter $\alpha$ can be computed for each travel profile so that the oscillatable mechanism of the machine or of the movable machine element is not excited for a predefined frequency between $1/t_r$ and infinity. The resonance frequencies of the mechanism can then be suppressed.

For $\alpha=0$, the frequency $f_0$ is infinite, which corresponds to the $\cos^2$ shape function $F_2(t)$. For $\alpha=1$, the frequency $f_0$ is exactly $1/t_r$, corresponding to the rectangular shape function $F_2(t)$.

In general, the entire frequency range can be covered by combining the two shape functions with in arbitrarily selected weighting factor $\alpha$. However, a useful range for the weighting factor $\alpha$ is between 0 and 1. Selecting the weighting factor $\alpha$ between 0 and 1 has the following advantages:
 the shape function has always a positive value
 the acceleration increases or decreases monotonously
 less electric power is dissipated
 less power is required, so that a small motor is sufficient.

FIG. 5 shows the jerk profiles 2a and 3a, which are modified by the shape functions, as well as the original unchanged rectangular jerk profile 1a. The $\cos^2$-shaped jerk profile 2a was modified with the $\cos^2$ shape function 2d depicted in FIG. 4 according to the equation (4). The parameter-dependent jerk profile 3a is obtained by modifying the rectangular jerk profile 1a with the parameter-dependent shape function $F_s(t, \alpha)$ according to equation (6) which is visualized in FIG. 4 as curve 3d. In the exemplary embodiment, the parameter $\alpha$ was set to $\alpha=0.345$. It should be noted that the shape of a jerk profile r(t) can be changed with the parameter-dependent shape function $F_s(t, \alpha)$ in such a way that the area of the jerk profile r(t) before the shape change is identical to the area of the jerk profile r(t) after the shape change at the same time. This prevents a loss in the length of the travel path. For this reason, the shape function $F_2(t)$ is multiplied by a factor of 2.

Figure 6:
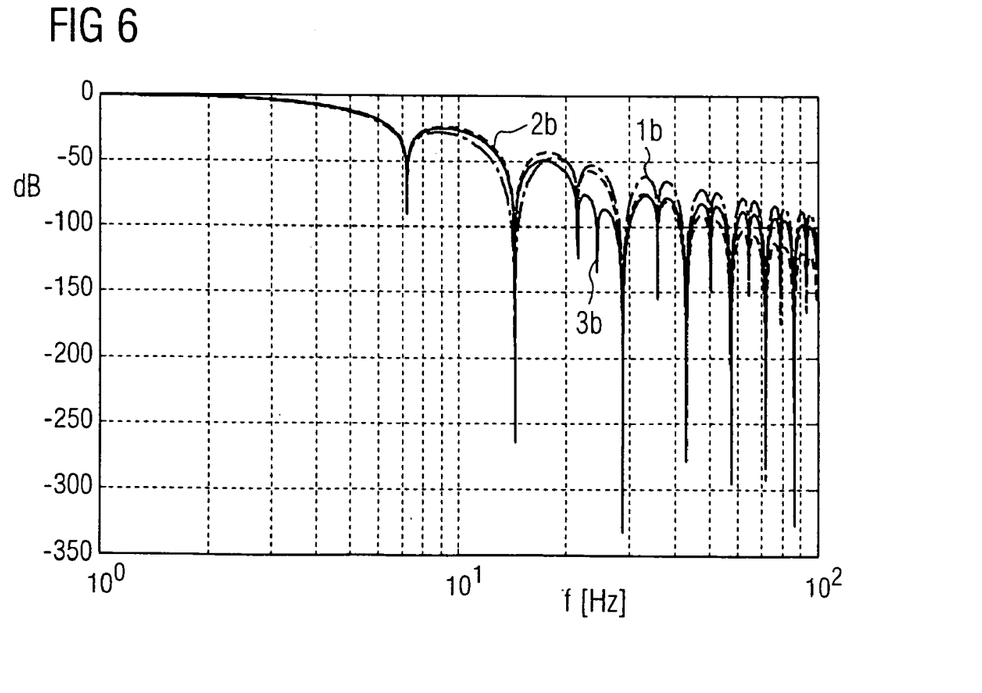
FIG. 6 is a graphical illustration of an amplitude-frequency curve of transfer functions of various jerk-equivalent filters.

FIG. 6 shows the frequency-dependent amplitude of the transfer function of the resulting jerk-equivalent filter obtained from the corresponding jerk profiles 1a, 2a, and 3a according to FIG. 5. The rectangular jerk profile 1a has a frequency-dependent amplitude curve 1b, the $\cos^2$-shaped jerk profile 2a has a frequency-dependent amplitude curve 2b, and the parameter-dependent jerk profile 3a has a frequency-dependent amplitude curve 3b.

In the illustrated exemplary embodiment, the resonance frequency of the mechanism of the machine is 24 Hz. As seen in FIG. 6, the frequency-dependent amplitude curve of the jerk profile 3a of FIG. 5 that was modified with the parameter-dependent shape function $F_s(t, \alpha)$ has a significantly higher damping at 24 Hz than the frequency-dependent amplitude curves of the jerk profiles 1a and 2a. The jerk profile 1a corresponds to a rectangular jerk profile, whereas the jerk profile 1b corresponds to a jerk profile that has been modified with the $\cos^2$ shape function $F_2(t)$. Accordingly, the machine components at the resonance frequency of 24 Hz are excited to a lesser degree when using a parameter-dependent jerk profile than with a $\cos^2$-shaped jerk profile or a purely rectangular jerk profile. This results in a faster and superior transient response characteristic from the actual position value to the desired position value.

Figure 7:
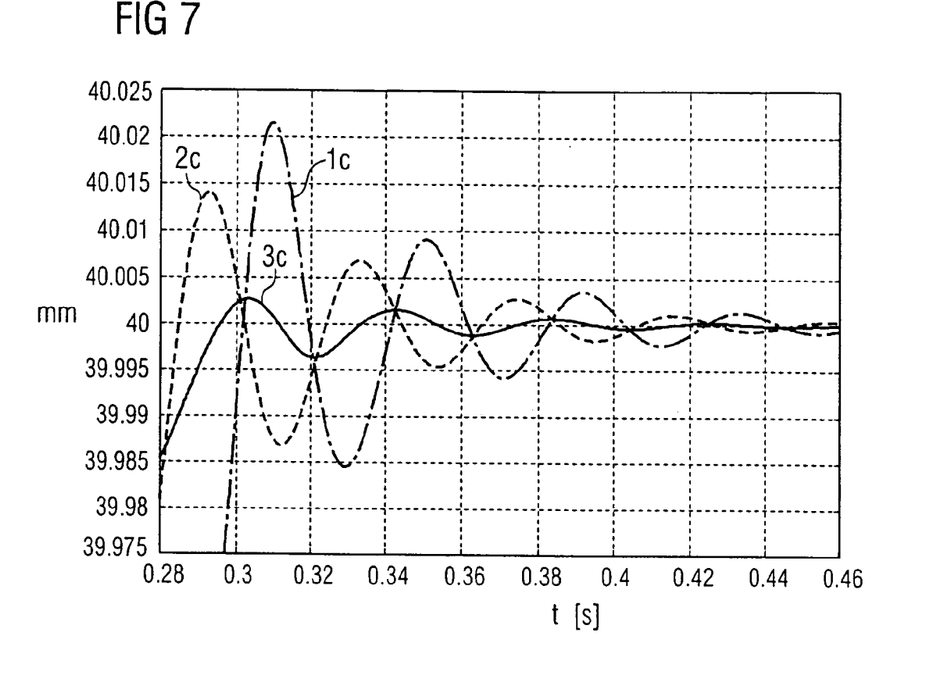
FIG. 7 is a graphical illustration of three transient responses.

FIG. 7 shows a graphic representation of the effect of modifying the jerk profiles 1a, 2a, and 3a according to the embodiment depicted in FIGS. 5 and 6. A movable machine element, e.g. a tool, is hereby moved from the position 0 to the desired initial position $u_{soll}(t)=40$ mm. The corresponding actual position value $x_{ist}(t)$ of the movable machine element is plotted in FIG. 7 as a function of time t. The curve 1c shows the time-dependence of the actual position value $x_{ist}(t)$ of the movable machine element when using the rectangular jerk profile 1a according to FIG. 5. The curve 2c shows the actual position value of the machine element when using the $\cos^2$-shaped jerk profile 2a, and the curve 3c shows the actual position value of the machine element when using the parameter-dependent jerk profile 3a with the parameter $\alpha=0.345$. As seen from the curve 3c, the actual position value $x_{ist}(t)$ approaches the desired initial position $u_{soll}(t)=40$ mm significantly faster and better than the actual position values depicted in curves 1c and 2c.

The dynamic properties of the machine can therefore be significantly improved by the parameter-dependent shape function of the invention as compared to the current technology.

Figure 8:
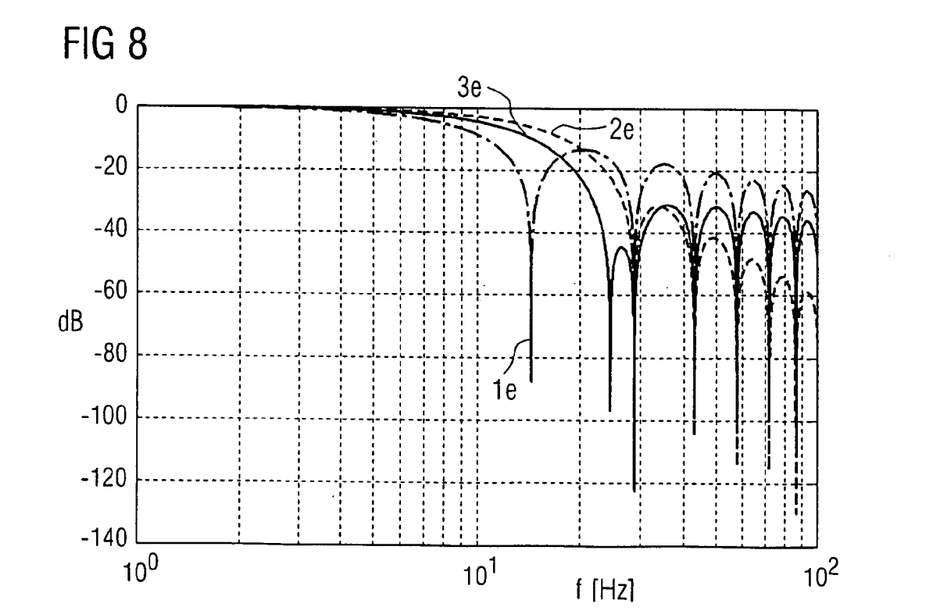
FIG. 8 is a graphical illustration of an amplitude-frequency curve of the corresponding shape functions for the responses of FIG. 7.

FIG. 8 shows the frequency-dependent amplitudes of the Fourier transform: curve 1e was obtained with the rectangular shape function of FIG. 5, curve 2e was obtained with the associated $\cos^2$ shape function, and curve 3e was obtained with the associated parameter-dependent shape function, with $\alpha=0.356$. It is evident that the frequency-dependent amplitude of the parameter-dependent shape function represents, i.a., a bandpass filter with a high damping in a frequency range around 24 Hz. The damping in this blocking region is considerably greater than with the frequency-dependent amplitude of the rectangular shape function or the $\cos^2$ shape function. Also evidently is here the significant improvement achieved by a parameter-dependent shape function as compared to the conventional rectangular or the $\cos^2$ shape functions.

It should be noted that, with the exception of the phase, a $\cos^2$ shape function is identical to a $\sin^2$ shape function. Accordingly, the $\cos^2$ function in the equations (4) and (6) can be replaced by a $\sin^2$ function.

The part of the equation (1) enclosed in square brackets describes the dependence of the transfer function A(f) of the jerk-equivalent filter R in the time intervals $t_a$ and $t_v$ depicted in FIG. 1. The process can be optimized globally by initially determining an optimized rectangular jerk profile r(t) before the machine element moves across the path defined by the controller of the machine, so that the frequencies of the bandpass filter coincide essentially with the characteristic frequencies of the machine element and/or the machine or with a subset of the characteristic frequencies. The time intervals $t_a$ and $t_v$ should be defined so as to satisfy the above condition. The already optimized rectangular jerk profile r(t) is subsequently further optimized by modification with the parameter-dependent shape function $F_s(t, \alpha)$.

Alternatively, the parameter-dependent shape function $F_s(t, \alpha)$ can also be obtained by adding a Dirac shape function $F_3(t)$ and the rectangular shape function $F_1(t)$. In principle, the entire frequency range can be covered by combining the two shape functions with a freely selected parameter $\alpha$. As before, an advantageous range for the parameter $\alpha$ is between 0 and 1.

The Dirac shape function $F_3(t)$ is defined by the equation:

$$F_3(t) = \frac{1}{2}\delta\left(t+\frac{t_r}{2}\right) + \frac{1}{2}\delta\left(t-\frac{t_r}{2}\right) \tag{9}$$

and visualized in FIG. 4 by the curve 4d.

The Fourier transform of the shape function $F_3(t)$ is defined by the equation (10):

$$\Im(F_3(t)) = \cos(\pi f t_r) \tag{10}$$

Accordingly, one obtains for the parameter-dependent shape function $F_s(t, \alpha)$:

$$F_s(t, \alpha) = \alpha \cdot \prod_{-\frac{t_r}{2}}^{\frac{t_r}{2}} \left(\frac{t}{t_r}\right) + (1-\alpha) \cdot \left(\frac{1}{2}\delta\left(t+\frac{t_r}{2}\right) + \frac{1}{2}\delta\left(t-\frac{t_r}{2}\right)\right) \tag{11}$$

Moreover, one obtains for the Fourier transform of the parameter-dependent shape function $F_s(t, \alpha)$:

$$\Im(F_s(t, \alpha)) = si(\pi f t_r) \cdot \frac{\alpha \tan(\pi f t_r) + (1-\alpha)\pi f t_r}{\tan(\pi f t_r)} \tag{12}$$

The frequency range of a bandpass filter associated with the single parameter $\alpha$ can be changed through suitable selection of the parameter $\alpha$. In general, the parameter-dependent shape function $F_s(t, \alpha_i)$ can also depend on several parameters $\alpha_i (i=1, 2, 3 \ldots)$. The frequency range of the different bandpass filters associated with an individual parameter $\alpha_i$ can be modified by intentionally changing the corresponding parameters $\alpha_i$. In other words, the frequency characteristic of a particular bandpass filter can be intentionally changed by changing a corresponding parameter $\alpha_i$.

The analytical shape of a parameter-dependent shape function $F_s(t, \alpha_i)$ that depends on several parameters $\alpha_i$ can be changed by linearly superposing different basic shape functions $F_i(t)$, such as $F_1(t)$, $F_2(t)$, and $F_3(t)$, according to the equation $$F(t, \alpha_i) = \sum_i \alpha_i \cdot F_i(t) \quad i = 1, 2, 3 \ldots \tag{13}$$

whereby as a consequence of the requirement $$\int_{-t_R/2}^{t_R/2} r(\tau)d\tau = 1 \tag{14}$$

the parameters $\alpha_i$ are governed by the following relationship $$\sum_i \alpha_i = 1 \tag{15}$$

The parameters $\alpha_i$ should be determined so as to minimize the excitations in the range of the resonance frequencies. The basic shape functions can be implemented herein as the rectangular shape function $F_1(t)$ introduced above, the $\cos^2$ shape function $F_2(t)$, and the Dirac shape function $F_3(t)$. It will be understood by those skilled in the art that a triangular shape function or a trapezoidal shape function or a similar shape function can also be used as a basic shape function.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A control method for controlling a speed of a movable machine element of a numerically controlled industrial processing machine with jerk limitation, comprising the steps of:
    decomposing a travel path of the movable machine element into a plurality of sequentially arranged, interpolatable travel sections;
    determining jerk profiles for the interpolatable travel sections; and
    modifying the jerk profiles with a parameter-dependent shape function obtained by adding a rectangular shape function and a Dirac shape function, with the modified jerk profile in a corresponding travel section providing a filter action represented by a bandpass filter having at least one blocking frequency,
    wherein the rectangular shape function and the Dirac shape function are each adjusted with a respective parameter, so that the at least one blocking frequency of the bandpass filter corresponds substantially to a characteristic frequency of the machine element.

2. The control method of claim 1, wherein the parameter-dependent shape function is defined by a plurality of parameters.

3. The control method of claim 2, wherein the parameter-dependent shape function is formed by adding a plurality of rectangular shape functions and Dirac shape functions, with each of the plurality of shape functions being weighted with a corresponding one of the plurality of parameters.

4. The control method of claim 3, and further adding weighted shape functions selected from the group consisting of $\cos^2$ or $\sin^2$ shape function, trapezoidal shape function, and triangular shape function.

5. The control method of claim 2, wherein the plurality of parameters are selected so as to define a plurality of blocking frequencies.

6. The control method of claim 1, wherein the parameter-dependent shape function is defined by a single parameter.

7. The control method of claim 6, wherein the parameter-dependent shape function is obtained by adding the rectangular shape function and the Dirac shape function, wherein weighting between the rectangular shape function and Dirac shape function is performed by the single parameter.

8. The control method of claim 1, wherein the shape of the jerk profile is modified by the parameter-dependent shape function so that an area of the jerk profile after the modification is identical to an area of the jerk profile before the modification, computed over an identical time interval.

9. The control method of claim 1, and further comprising the steps of before executing a defined travel path of the movable machine element, determining rectangular jerk profiles optimized for the corresponding interpolatable travel sections, such that the blocking frequencies of the bandpass filters coincide essentially with the characteristic frequencies of the machine element, and then further optimizing the previously optimized rectangular jerk profile with the parameter-dependent shape function.

10. The control method of claim 1, wherein the industrial processing machine comprises a machine selected from the group consisting of machine tool, production machine and robot.

11. A control method for controlling a speed of a movable machine element of a numerically controlled industrial processing machine with jerk limitation, comprising the steps of:
    decomposing a travel path of the movable machine element into a plurality of sequentially arranged, interpolatable travel sections;
    determining jerk profiles for the interpolatable travel sections; and
    modifying the jerk profiles with a parameter-dependent shape function obtained by adding a rectangular shape function and a $\cos^2$ or $\sin^2$ shape function, with the modified jerk profile in a corresponding travel section providing a filter action represented by a bandpass filter having at least one blocking frequency,
    wherein the rectangular shape function and the $\cos^2$ or $\sin^2$ shape function are each adjusted with a respective parameter, so that the at least one blocking frequency of the bandpass filter corresponds substantially to a characteristic frequency of the machine element.

12. The control method of claim 11, wherein the parameter-dependent shape function is defined by a single parameter.

13. The control method of claim 12, wherein the parameter-dependent shape function is obtained by adding the rectangular shape function and $\cos^2$ or $\sin^2$ shape function, with weighting between the rectangular and $\cos^2$ or $\sin^2$ shape functions performed by the single parameter.

14. The control method of claim 11, wherein the parameter-dependent shape function is defined by a plurality of parameters.

15. The control method of claim 14, wherein the parameter-dependent shape function is formed by adding a plurality of rectangular shape functions and $\cos^2$ or $\sin^2$ shape functions, with each of the plurality of shape functions being weighted with a corresponding one of the plurality of parameters.

16. The control method of claim 15, and further adding weighted shape functions selected from the group consisting of Dirac shape function, trapezoidal shape function, and triangular shape function.

17. The control method of claim 14, wherein the plurality of parameters are selected so as to define a plurality of blocking frequencies.

18. The control method of claim 11, wherein the industrial processing machine comprises a machine selected from the group consisting of machine tool, production machine and robot.

* * * * *